United States Patent
Morris et al.

(10) Patent No.: US 9,568,127 B2
(45) Date of Patent: Feb. 14, 2017

(54) MECHANICAL PIPE COUPLING ASSEMBLY WITHOUT ADHESIVE OR BONDING AGENT

(71) Applicant: CHARLOTTE PIPE AND FOUNDRY COMPANY, Charlotte, NC (US)

(72) Inventors: William Boykin Morris, Charlotte, NC (US); Gregory Eugene Nahrgang, Charlotte, NC (US); Adam John Miloser, Charlotte, NC (US); Haskell Simpkins, Cincinnati, OH (US); Robert Gerald States, III, Morrow, OH (US)

(73) Assignee: Charlotte Pipe and Foundry Company, Charlotte, NC (US)

( * ) Notice: Subject to any disclaimer, the term of this patent is extended or adjusted under 35 U.S.C. 154(b) by 249 days.

(21) Appl. No.: 14/318,910

(22) Filed: Jun. 30, 2014

(65) Prior Publication Data

US 2014/0312616 A1   Oct. 23, 2014

Related U.S. Application Data

(63) Continuation of application No. 13/685,876, filed on Nov. 27, 2012, now Pat. No. 8,801,048.

(51) Int. Cl.
| | | |
|---|---|---|
| *F16L 19/06* | (2006.01) | |
| *F16L 17/025* | (2006.01) | |
| *F16L 47/00* | (2006.01) | |
| *F16L 37/091* | (2006.01) | |

(52) U.S. Cl.
CPC ............ *F16L 17/025* (2013.01); *F16L 37/091* (2013.01); *F16L 47/00* (2013.01)

(58) Field of Classification Search
USPC ................. 285/902, 340, 345, 307
See application file for complete search history.

(56) References Cited

U.S. PATENT DOCUMENTS

| 3,118,682 A | 1/1964 | Fredd |
| 3,376,060 A | 4/1968 | Tomioka |
| 3,483,789 A | 12/1969 | Wurzel |
| 3,829,227 A | 8/1974 | Derman |
| 3,924,882 A | 12/1975 | Ellis |
| 4,073,514 A | 2/1978 | Pate |
| 4,084,843 A | 4/1978 | Gassert |

(Continued)

FOREIGN PATENT DOCUMENTS

| WO | 9425786 A1 | 11/1994 |
| WO | 2014084985 A1 | 6/2014 |

OTHER PUBLICATIONS

PCT International Search Report for PCT International Patent Application No. PCT/US2013/066029.

*Primary Examiner* — Aaron Dunwoody
(74) *Attorney, Agent, or Firm* — Nelson Mullins Riley & Scarborough LLP

(57) ABSTRACT

A mechanical coupling between a straight pipe end and a socket fitting comprises a seal ring and a locking ring disposed within the interior of the socket. The locking ring has a generally frustoconical shape with a plurality of corrugations extending circumferentially thereabout, the corrugations presenting inner edge portions engaging the outer annular surface of the pipe end and outer edge portions engaging the interior annular surface of the socket for opposing withdrawal of the pipe end axially outwardly from the socket. In an advantageous embodiment, the locking ring is assembled with a support disk to optimally orient the locking ring with respect to the fitting and the pipe end.

12 Claims, 6 Drawing Sheets

(56) References Cited

U.S. PATENT DOCUMENTS

| | | |
|---|---|---|
| 4,146,254 A | 3/1979 | Turner et al. |
| 4,586,734 A | 5/1986 | Grenier |
| 4,600,223 A | 7/1986 | de Vries |
| 4,747,626 A | 5/1988 | Hama et al. |
| 5,029,908 A | 7/1991 | Belisaire |
| 5,527,073 A | 6/1996 | Readman |
| 5,603,530 A | 2/1997 | Guest |
| 5,681,062 A | 10/1997 | Fukao et al. |
| 5,692,784 A | 12/1997 | Hama et al. |
| RE36,630 E | 3/2000 | Davey |
| 6,231,090 B1 | 5/2001 | Fukao et al. |
| 6,464,266 B1 | 10/2002 | O'Neill et al. |
| 6,488,319 B2 | 12/2002 | Jones |
| 6,499,771 B1 | 12/2002 | Snyder, Sr. et al. |
| 6,719,330 B2 | 4/2004 | Brown et al. |
| 7,055,829 B2 | 6/2006 | Russell |
| 7,316,429 B2 | 1/2008 | Viegener |
| 7,341,286 B2 | 3/2008 | Andre |
| 7,448,654 B2 | 11/2008 | Le Quere |
| 7,841,630 B1 | 11/2010 | Auray et al. |
| 8,474,877 B2 | 7/2013 | Smith |
| 2002/0185868 A1 | 12/2002 | Snyder, Sr. et al. |
| 2006/0214422 A1 | 9/2006 | Cuvo et al. |
| 2009/0243288 A1 | 10/2009 | O'Neill et al. |
| 2011/0140417 A1 | 6/2011 | Kluss et al. |
| 2012/0217742 A1 | 8/2012 | Furuya et al. |
| 2013/0106104 A1 | 5/2013 | Le Quere |

MECHANICAL PIPE COUPLING ASSEMBLY WITHOUT ADHESIVE OR BONDING AGENT

CROSS-REFERENCE TO RELATED APPLICATION

This is a continuation of co-pending U.S. patent application Ser. No. 13/685,876, filed Nov. 27, 2012, entitled "MECHANICAL PIPE COUPLING ASSEMBLY WITHOUT ADHESIVE OR BONDING AGENT."

BACKGROUND OF THE INVENTION

The present invention relates generally to fluid conveying pipe systems and, more particularly, to mechanical couplings used in such pipe systems, for example, to join pipes with other pipes or with pipe fittings.

Various forms of pipe systems are well known for use in diverse applications, ranging for example from plumbing systems conveying potable drinking water under pressure, to waste water systems, often referred to as drain/waste/vent (or DWV) systems, conveying sewage and gray water gravitationally under neutral pressure, to laboratory and other systems conveying potentially dangerous chemical liquids and gases.

Essentially all such pipe systems are fabricated of a network of straight pipe sections coupled together with various fittings. Depending on the application, pipe sections and fittings may be formed of various materials, typically either metallic materials such as cast-iron, galvanized steel and copper, or plastic materials, such as PVC (polyvinyl chloride), PP (polypropylene), ABS (acrylonitrile butadiene styrene), or PE (polyethylene). In substantially all cases, the coupling joints in a pipe system must be secure against leakage. In most plastic pipe systems, this is accomplished by the use of a cement or other chemical bonding agent suitable to establish a chemical bond between pipe sections and fittings.

While bonded couplings provide reliable and secure joints between pipe sections and fittings in plastic pipe systems, the use of cements and bonding agents is increasingly disfavored and coming under increasing regulatory scrutiny because of potential environmental dangers presented by the chemicals utilized. While considerable effort has been devoted toward the development of alternative mechanical forms of pipe joints or couplings in plastic pipe systems, such mechanical couplings have yet to become widely accepted and in many cases still fail to meet local codes. For example, most local plumbing codes governing DWV systems still require the use of chemical bonding agents. There is accordingly a need within the plastic pipe industry for a satisfactory form of coupling assembly by which pipes and fittings may be mechanically joined without requiring the use of any adhesive or bonding agent.

SUMMARY OF THE INVENTION

It is accordingly an object of the present invention to provide an improved form of mechanical pipe coupling assembly. A more particular object of the present invention is to provide a mechanical pipe coupling assembly suitable for use with plastic pipes, especially in but not limited to DWV systems, without requiring an adhesive or bonding agent to be used. A further object of the present invention is to provide a mechanical pipe coupling assembly that can also be suitable for use with metal pipe systems.

As used herein, the terms "coupling," "fitting," "socket", "pipe" and the "end" of a pipe are used, and intended to be understood and interpreted, in their broadest generic sense not inconsistent with but not limited to any common industry usage. A "pipe" is used herein to encompass any tubular structure capable of fluid conveyance therethrough and an "end" of a pipe is any termination of the tubular structure defining an opening through which fluid enters or exits the pipe. A "pipe" may be linear (straight) or non-linear (e.g., curvilinear) in the direction of fluid conveyance, and may be of differing transverse cross-sectional shapes, often round but not necessarily cylindrical or uniform in transverse cross-section. Pipes include for example tubular structures with uniform inner and outer diameters defining a cylindrical tubular structure, as are often commonly referred to as pipes, but also include other tubular components such as spigots. A "fitting" is used herein to encompass any tubular structure having an end portion which defines an end opening capable of receiving and mating with an "end" of a "pipe." A "fitting" may be an independent component in itself or a part of another component, and may or may not be enlarged relative to any portion of the remainder of the "fitting" structure. For example, a "fitting" may be a tubular structure with an enlarged end configuration forming "socket" configured to receive a pipe end, but may also be a tubular structure without any end enlargement, even another pipe with an end of a size and configuration that can receive the end of another pipe. A "coupling" is used herein to encompass any structure in which a "fitting" and an "end" of a "pipe" are assembled together.

According to one aspect of the present invention, a coupling assembly is provided which basically comprises a pipe and a fitting mechanically joined without an adhesive or bonding agent. More specifically, in the coupling assembly, the fitting comprises an end portion having an end opening defined by an interior annular surface and the pipe comprises an end having an outer annular surface received within the end opening of the fitting. According to the invention, the coupling assembly utilizes a seal ring disposed within the end portion of the fitting in sealing contact with the interior annular surface thereof and with the outer annular surface of the pipe end, and a locking ring is also disposed within the end portion of the fitting adjacent the seal ring. The locking ring has a plurality of corrugations extending circumferentially thereabout, the corrugations presenting inner edge portions engaging the outer annular surface of the pipe end and outer edge portions engaging the interior annular surface of the end portion of the fitting for opposing withdrawal of the pipe end axially outwardly from the fitting.

Advantageously, the fitting and the pipe may be formed of a thermoplastic material such as PVC (polyvinyl chloride). The pipe and fitting may be adapted for non-pressurized fluid flow therethrough, e.g., for drain, waste and vent applications.

The locking ring may be formed of a metallic material for enhanced engagement with the pipe end and the socket of the fitting. In a preferred embodiment, the locking ring has a generally frusto-conical shape. The corrugations of the locking ring preferably extend at a conical angle of between about five degrees (5°) and about twenty-five degrees (25°), most preferably at about fifteen degrees (15°). The corrugations also preferably have a generally squared configuration and may optionally have their inner and outer edge portions selectively shaped, e.g., sharpened or otherwise profiled.

In one embodiment, the coupling assembly may include a spacer disk disposed within the end portion of the fitting between the seal ring and the locking ring, to prevent the locking ring from engaging into the seal ring.

In another embodiment, the coupling assembly may include a support disk disposed within the end portion of the fitting adjacent the seal ring and in assembly with the locking ring for supporting the locking ring in a predetermined disposition relative to the outer annular surface of the pipe end and the interior annular surface of the end portion of the fitting. The support disk may comprise a plurality of support elements spaced apart circumferentially thereabout, and shoulders at opposite axial sides of the support elements, with the locking ring interwoven with the support elements with the corrugations alternatingly disposed inwardly and outwardly of the support elements and between the shoulders.

The end portion of the fitting may comprise a socket having an essentially cylindrical interior annular surface including an axially inner region of a diameter essentially mated to the outer annular surface of the pipe end and an axially outer region of a diameter enlarged from the axially inner region, with the seal ring and the locking ring being disposed adjacent one another within the enlarged outer region of the interior annular surface of the socket.

A pipe fitting assembly comprised of the fitting together with the seal and locking ring forms another novel aspect of the present invention. More specifically, the fitting includes an end portion having an end opening defined by an interior annular surface for receiving a pipe end. The seal ring is adapted for disposition within the end portion of the fitting for sealing contact with the interior annular surface thereof and with the outer annular surface of the pipe end when the pipe end is received within the end portion of the fitting. The locking ring is also adapted for disposition within the end portion of the fitting adjacent the seal ring, the locking ring having a plurality of corrugations extending circumferentially thereabout and presenting inner edge portions for engaging the outer annular surface of the pipe end and outer edge portions for engaging the interior annular surface of the end portion of the fitting when the pipe end is received within the end portion of the fitting, thereby for opposing withdrawal of the pipe end axially outwardly from the fitting. In this manner, the pipe fitting assembly is adapted for mechanical joinder with a pipe end without requiring an adhesive or bonding agent.

The locking ring in itself forms another novel aspect of the present invention. As noted, the locking ring comprises a plurality of circumferentially extending corrugations which present inner edge portions for engaging an outer annular surface of a pipe end and outer edge portions for engaging an interior annular surface of an end portion of a fitting when the pipe end is received within the end portion of the fitting, thereby to oppose withdrawal of the pipe end axially outwardly from the fitting.

Further, the assembly of the locking ring and the support disk forms a locking device which is another novel aspect of the invention. Briefly summarized, the locking device comprises in combination a locking ring with a plurality of corrugations extending circumferentially thereabout, and a support disk with a plurality of support elements spaced apart circumferentially thereabout and shoulders at opposite axial sides of the support elements, with the locking ring interwoven with the support elements with the corrugations alternatingly disposed inwardly and outwardly of the support elements and between the shoulders. In this manner, the locking ring is supported for orientation in a predetermined disposition relative to a pipe end and an end portion of a fitting when disposed therebetween, such that the corrugations present inner edge portions for engaging an outer annular surface of the pipe end and outer edge portions for engaging an interior annular surface of the end portion of the fitting when the pipe end is received within the end portion of the fitting for opposing withdrawal of the pipe end axially outwardly from the fitting.

These and other novel aspects, features and advantages of the present invention will be apparent from the following disclosure of a preferred embodiment of the invention as depicted in the accompanying drawings.

DETAILED DESCRIPTION OF THE PREFERRED EMBODIMENTS

Figure 1:
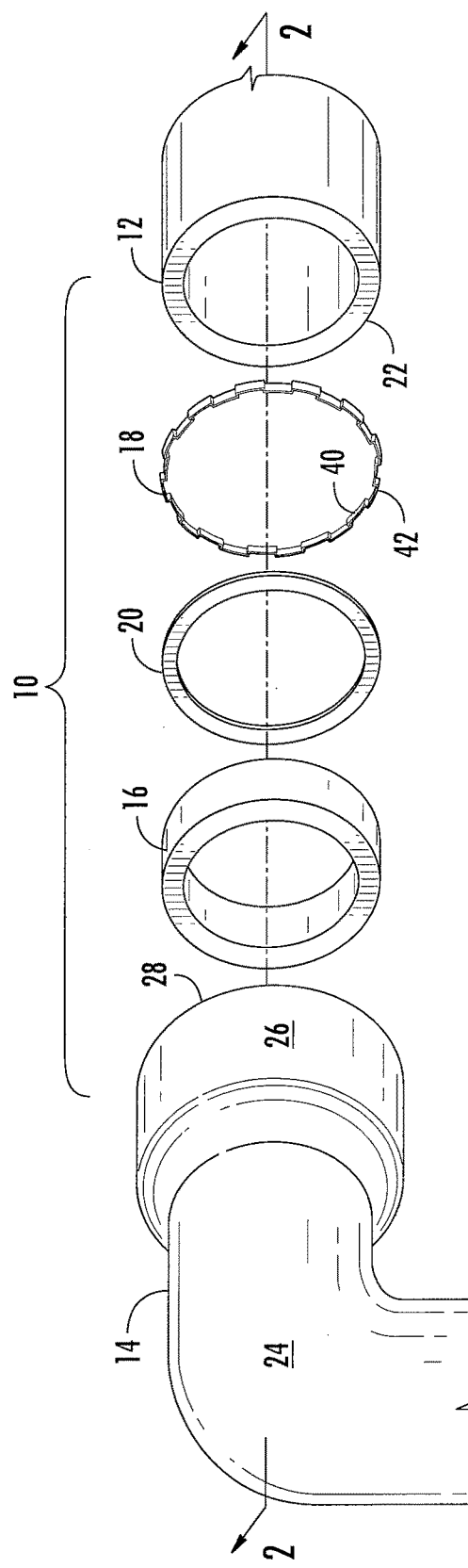
FIG. 1 is an exploded perspective view of one preferred embodiment of a mechanical pipe coupling assembly in accordance with the present invention.
Figure 2:
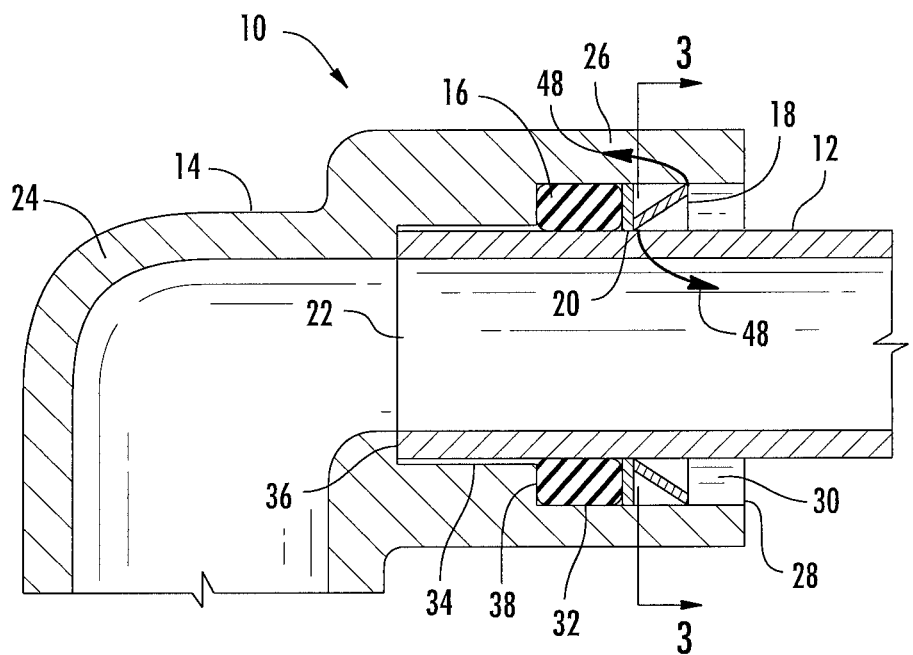
FIG. 2 is an axial cross-sectional view of the mechanical pipe coupling assembly of FIG. 1 in assembled form, taken along line 2-2 thereof.

Referring now to the accompanying drawings and initially to FIGS. 1 and 2, one representative embodiment of a mechanical pipe coupling assembly according to the present invention is depicted overall at 10, and basically comprises a pipe section 12, a mateable pipe fitting 14 (which may be an independent component or an end portion of another pipe section), a seal ring 16, a locking ring 18, and a spacer disk 20 which collectively serve to join and retain the pipe section 12 and the pipe fitting 14 together; as more fully described hereinafter.

In the illustrated embodiment of FIGS. 1 and 2, the pipe section 12 and the pipe fitting 14 are fabricated of a plastic material, for example, PVC (polyvinyl chloride), such as are commonly employed in DWV (drained/waste/vent) plumbing installations, but it is to be expressly understood that the present invention is anticipated to be equally applicable to the joinder of other forms of plastic pipe and fittings made of other materials and potentially also to metal pipes and fittings such as those made of cast-iron. The present invention is not limited to the illustrated embodiment, which is provided only by way of example for the purpose of providing a full and enabling disclosure of the invention.

The pipe section 12 is a conventional length of straight linear cylindrical pipe with a plain circular end 22, i.e., of the same diameter as the remaining length of the pipe without any flange, socket or other end structure. The fitting 14 is a so-called elbow fitting having a tubular body 24 of substantially the same diameter as the pipe section 12 but formed into an angular bend which merges into an enlarged bell portion 26 opening outwardly at one end (and possibly both ends) of the body 24 to define an end opening 28 into an interior receiving socket 30 within the bell portion 26 for receiving the pipe end 22. However, as persons skilled in the relevant art will readily recognize and understand, the present invention is equally well adapted to the coupling of other forms of pipe sections and fittings, e.g., any pipe or fitting having an end mateable with any form of receiving portion, whether on another section of pipe or other fitting.

As seen in FIG. 2, the bell portion 26 of the fitting 14 is formed with a stepped interior profile presenting a recessed annular region 32 of a relatively larger diameter located axially outwardly adjacent the end opening 28 and an inner annular region 34 of a more narrow diameter located axially inwardly of the recessed outer annular region 32. The diameter of the axially inner annular region 34 is substantially mated to the outside diameter of the end 22 of the pipe section 12, i.e., just slightly larger in diameter and slightly tapered, to facilitate receipt of the pipe end 22. A radial shoulder 36 is formed at the axially inwardmost end of the annular region 34 to provide an abutment stop to engage the end face of the pipe end 22 when inserted through the end opening 28 and into the socket 30, thereby to position the pipe section 12 relative to the fitting 14.

The seal ring 16 may be any suitable annular member capable of establishing sealing engagement about the outer annular surface of the pipe end 22 and the interior annular surface of the outer annular region 32 within the bell portion 26. In the illustrated embodiment, a representative seal ring 16 is shown as an annular body formed of a resilient compressible material, e.g., an elastomeric material, with an inner diameter the same as or slightly less than the outer diameter of the outer annular surface of the pipe end 22 and with an outer diameter the same as or slightly greater than the inner diameter of the outer annular region 32 within the bell portion 26 of the fitting 14. In this manner, the seal ring 16 may be fitted snugly into the outer annular region of the bell portion 26 with its outer annular surface in sealing contact with the surface of the outer annular region 32 and, when the pipe end 22 is inserted into the socket 30 and advanced into abutment with the shoulder 36, the resiliency of the seal ring 16 yields to similarly engage sealably about the outer surface of the pipe end 22, as depicted in FIG. 2. The stepped interior profile of the bell portion 26 between the outer and inner annular regions 32, 34 forms another shoulder 38 against which the seal ring 16 may be seated when fitted into the bell portion 26. The shoulder 38 may be angled relative to the radius of the bell portion 26 to provide additional radial support to the seal ring 16.

The spacer disk 20 is a substantially flat ring-like annular disk in the nature of a washer having an outer diameter slightly less than the inner diameter of the outer annular region 32 within the bell portion 26 and an inner diameter slightly greater than the outer diameter of the outer annular surface of the pipe end 22, whereby the spacer disk 20 may be received within the outer annular region of the bell portion 26 in axially facing abutment with the seal ring 16, as depicted in FIG. 2.

Figure 5:
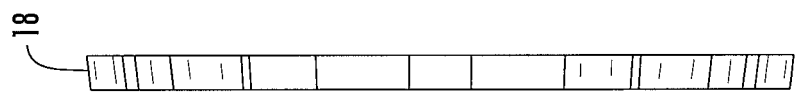
FIG. 5 is a side elevational view of the locking ring of FIG. 4.
Figure 4:
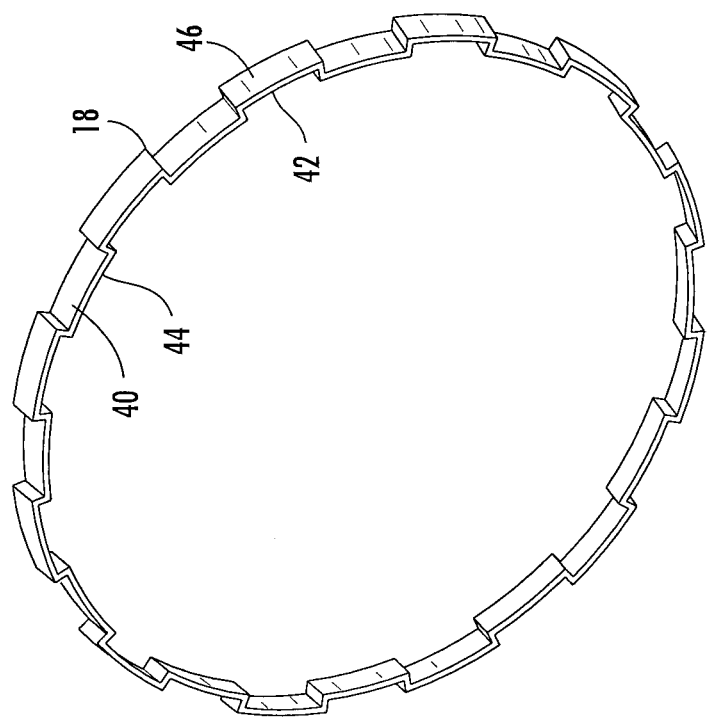
FIG. 4 is an enlarged perspective view of the locking ring of the mechanical pipe coupling assembly of FIGS. 1 and 2.
Figure 7:
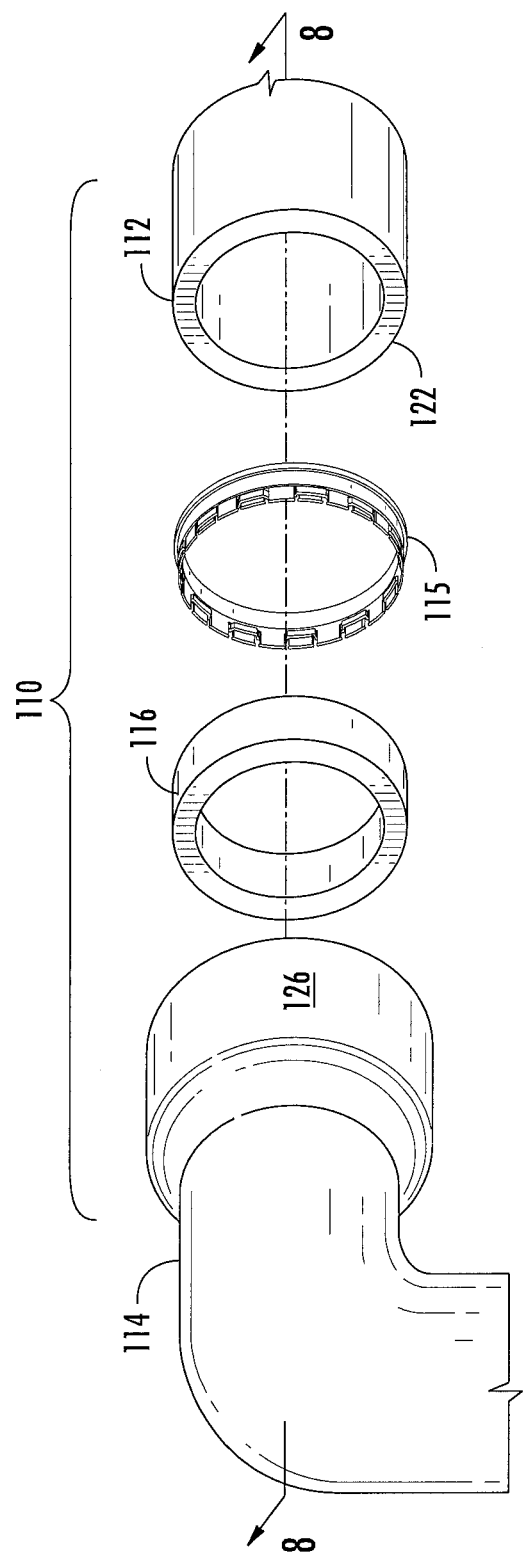
FIG. 7 is an exploded perspective view of another preferred embodiment of a mechanical pipe coupling assembly in accordance with the present invention.

As best seen in FIGS. 4 and 5, the locking ring 18 is an annular corrugated band, preferably made of a flat strip of metal fashioned into a uniformly corrugated configuration presenting a plurality of inner and outer squared corrugations 40, 42, respectively, alternating circumferentially at regular spacings about the full annular extent of the locking ring 18. However, as persons of skill in the art will recognize and understand, other corrugated, castellated or undulating configurations of the band are also contemplated to be possible. The locking ring 18 is preferably formed into a frusto-conical configuration in side-elevation, as seen in FIG. 5, with the spaced-apart outer corrugations 42 collectively extending within a common conical frustum and, likewise, with the space-apart inner corrugations 40 collectively extending within a smaller common conical frustum of lesser diametric dimensions. Optionally, the inner and outer edges 44, 46, respectively, of the locking ring 18 may be sharpened.

The diameter of the locking ring 18 as measured across the inner edge 44 between opposed inner corrugations 40 has a diameter substantially the same as or slightly less than the outer diameter of the outer annular surface of the pipe end 22. The diameter of the locking ring 18 as measured across the outer edge 46 between opposed outer corrugations 42 has a diameter substantially the same as or slightly greater than the inner diameter of the outer annular region 32 within the bell portion 26 of the fitting 14. The metal or other material out of which the locking ring 18 is fabricated should preferably provide a spring-like character imparting a degree of resiliency in the diametric direction, allowing the locking ring 18 to be fitted into the outer annular region of the bell portion 26 with the outer edge 46 at the outer corrugations 42 in contact with the surface of the outer annular region 32 and, when the pipe end 22 is inserted into the socket 30 and advanced into abutment with the shoulder 36, with the inner edge 44 at the inner corrugations 40 similarly in contact with the outer surface of the pipe end 22, as depicted in FIG. 2.

Figure 6C:
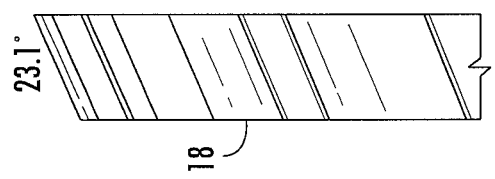
FIGS. 6A, 6B and 6C are side elevational views depicting differing embodiments of the locking ring of the present invention.
Figure 6B:
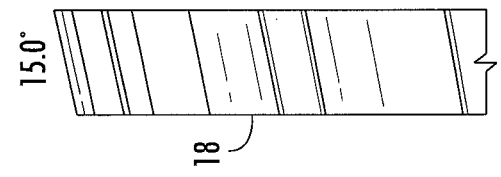
Figure 6A:
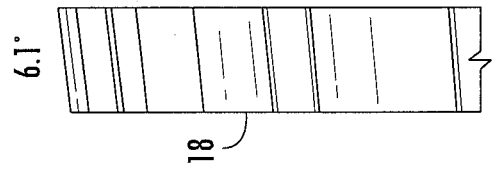

It is contemplated that the conical taper angle of the locking ring 18 may vary within a relatively wide degree, as representatively depicted comparatively by FIGS. 6A, 6B and 6C. Specifically, in FIGS. 4, 5 and 6A, the conical taper angle at both the inner and outer corrugations 40, 42 is 6.1 degrees, whereas in FIG. 6B, the conical taper angle is 15 degrees and in FIG. 6C, the conical taper angle is 23.1 degrees. However, it is to be expressly understood that various other conical taper angles are contemplated to be possible and may be selected to provide differing performance characteristics within the locking ring 18, depending upon various parameters, such as the material of the pipe 12 and the fitting 14, the diameter of the pipe 12 and the fitting 14, the end-use application for the coupling 10, etc. Without limiting the generality of the foregoing, it is presently contemplated that for the majority of applications and embodiments of the coupling 10, the conical taper angle for the locking ring 18 should be between about 5 degrees and about 25 degrees, and preferably about 15 degrees.

With reference again to FIGS. 1 and 2, the assembly and operation of the coupling 10 of the present invention may be understood. Initially, the seal ring 16, the spacer disk 20 and the locking ring 18 are inserted through the end opening 28 into the socket 30 within the bell portion 26 and fitted into place within the profiled outer annular region 32, as above-described. Specifically, the seal ring 16 is abutted against the shoulder 36 with the outer annular surface of the seal ring 16 in surface engagement annularly about the interior surface of the outer annular region 32. The spacer disk 20 is positioned in face abutment against the axially outwardly facing radial side of the seal ring 16. The locking ring 18 is positioned within the outer annular region 32 immediately axially adjacent the spacer disk 20, with the inner edge 44 of the locking ring 18 facing axially inwardly relative to the end opening 28 of the bell portion 26 and with the outer corrugations 42 at the outer edge 46 of the locking ring 18 contacting the interior surface of the outer annular region 32, all as depicted in FIG. 2.

Figure 3:
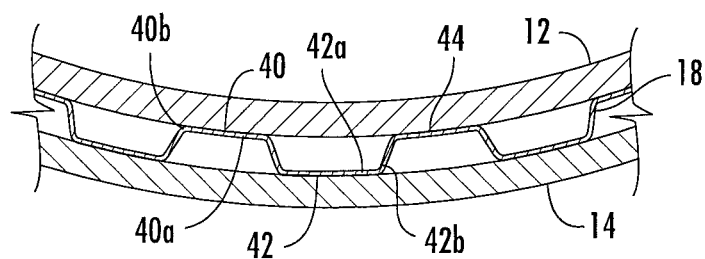
FIG. 3 is a partial vertical cross-sectional view of the mechanical pipe coupling assembly of FIGS. 1 and 2, taken along line 3-3 of FIG. 2.

With the seal ring 16, the spacer disk 20 and the locking ring 18 in place within the fitting 14, the end 22 of the pipe 12 is inserted through the end opening 28 into the socket 30 and advanced centrally through the locking ring 18, the spacer disk 20 and the seal ring 16 until the end face of the pipe end 22 abuts against the shoulder 36. At this point, the inner annular surface of the seal ring 16 yields and conforms to the outer annular surface of the pipe end 22. Similarly, owing to the spring character of the locking ring 18, the locking ring 18 yields to the pipe end 22 causing the inner edge 44 at the inner corrugations 40 of the locking ring 18 to engage with the outer annular surface of the pipe end 22, as represented in FIG. 3.

The assembly of the seal ring 16, the spacer disk 20 and the locking ring 18 cooperates to support the pipe end 22 and to oppose any force acting axially outwardly from the socket 30 of the fitting 14 to substantially prevent withdrawal of the pipe end 22 from the socket 30. Upon the exertion of any such force, a rotational moment is produced within the locking ring 18, as represented by arrows 48 in FIG. 2, causing the withdrawal force to be applied at the inner and outer edges 44, 46 of the inner and outer corrugations 40, 42 against the outer annular surface of the pipe end 22 and the inner annular surface of the region 32 within the socket 30 to increase the engagement between the locking ring 18, the pipe and 22 and the fitting 14. The central portions 40a, 42a of the corrugations 40, 42 tend to bow slightly under such a withdrawal force, whereby the principal engagement between the locking ring 18 and the pipe end 22 and the socket 30 is concentrated at the corners 40b, 42b of the corrugations, while at the same time the central portions 40a, 42a of the corrugations 40, 42 prevent the corners 40b, 42b from penetrating damage to the outer annular surface of the pipe end 22, which is particularly advantageous in applications using pipe having a foam core sandwiched between inner and outer plastic shell layers. As the withdrawal force increases, this engagement proportionally increases, thereby resisting and substantially preventing withdrawal of the pipe 12.

Advantageously, the described non-penetrating engagement between the locking ring 18, the pipe end 22 and the socket 30 also facilitates the separation and disassembly of the pipe end 22 from the socket 30 when and if desired or necessary. A twisting rotation of the pipe end 22 relative to the socket 30 and the locking ring 18 accompanied by simultaneous application of a gradual outward withdrawal force permits the pipe end 22 to be gradually withdrawn progressively through the locking ring 18. Likewise, the corrugated configuration of the locking ring 18 and the non-penetrating engagement which it achieves with the pipe end 22 permits a removal tool (not shown) to be inserted axially between the pipe end and the locking ring to separate the locking ring 18 from the pipe end 22 sufficiently to allow the pipe end to be withdrawn from the socket.

Turning now to FIGS. 7-11, a second representative embodiment of a mechanical pipe coupling assembly according to the present invention is depicted overall at 110, and basically comprises a pipe section 112, a mateable pipe fitting 114, a seal ring 116, and a locking device 115 which collectively serve to join and retain the pipe section 112 and the pipe fitting 114 together. In the pipe coupling assembly 110, the pipe section 112, the pipe fitting 114 and the seal ring 116 are substantially the same as the corresponding components in the above-described embodiment of FIGS. 1-6. The pipe coupling assembly 110 differs from the embodiment of FIGS. 1-6 primarily in the locking device 115, and in the interior profile of the fitting 114 to receive the locking device 115, all as discussed in greater detail below.

Figure 11:
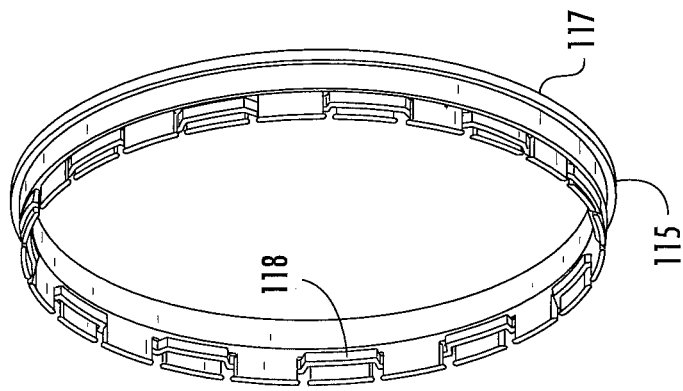
FIG. 11 is a perspective view of the locking device of the mechanical pipe coupling assembly of FIGS. 7 and 8 in assembled form.
Figure 10:
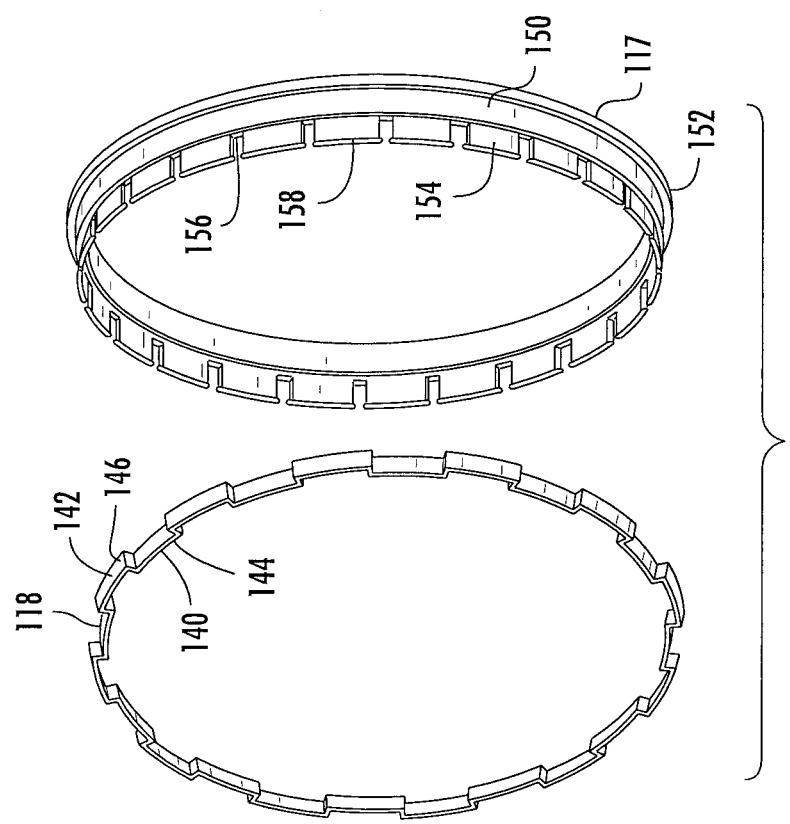
FIG. 10 is an exploded perspective view of the locking device of the mechanical pipe coupling assembly of FIGS. 7 and 8.

With specific reference to FIGS. 10 and 11, the locking device 115 basically comprises an assembly of a support disk 117 and a locking ring 118, which is substantially identical in construction to the locking ring 18 of the embodiment of FIGS. 1-6. As best seen in FIG. 10, the support disk 117 is annular body having a central cylindrical main body portion 150 with an enlarged lip 152 projecting radially outwardly from one axial side of the main body portion 150 and a plurality of support elements 154 projecting axially from the other axial side of the main body portion 150 at regular circumferential spacings thereabout. Each of the support elements 154 is generally rectangular in shape with an arcuate curvature in the direction of the circumference of the support disk 117. The main body portion 150 of the support disk 117 forms a radially outer annular shoulder 156 and a radially inner annular shoulder 157 adjacent each of the support elements 154, and the axially outwardmost edge of each support element 154 is formed with a lip 158 in facing relation to the shoulder 156.

In the locking device 115, locking ring 118 is assembled with the support disk 117, with the corrugations 140, 142 of the locking ring 118 alternatingly interwoven with the support elements 154 of the support disk 117, i.e., with the inner corrugations 140 situated radially inwardly of alternate support elements 154 and the outer corrugations 142 situated radially outwardly of the intervening support elements 154, the outer corrugations 142 being contained between the shoulder 156 of the main body portion 150 and the lips 158 of such intervening support elements 154. In such assembled condition, and prior to assembly with the pipe end 112 and the coupling 110, the locking ring 118 is held in a relaxed non-tensioned condition within the support disk 117, with the inner edges 144 of the corrugations 140 protruding slightly radially inwardly beyond the main body portion 150 and with the outer edges 146 of the corrugations 142 protruding slightly radially outwardly beyond the main body portion 150.

As previously noted, the pipe fitting 114 is substantially the same as the fitting 14 in the embodiment of FIGS. 1-6, except that the interior profile of bell portion 126 of the fitting 114 is slightly modified to include an enlarged recess 160 at the outward end face of the bell portion 126 defining an outwardly facing shoulder 162 compatible with the outer lip 152 of the support disk 117. In this manner, the locking device 115 is adapted to fit securely into socket 130 within the bell portion 126, with the outer lip 152 of the support disk 117 fitted into the recess 160 and against the shoulder 162 of the bell portion 126 and with the main body portion 150 of the support disk 117 fitted in facing engagement with the outer annular region of the socket profile 132.

Figure 8:
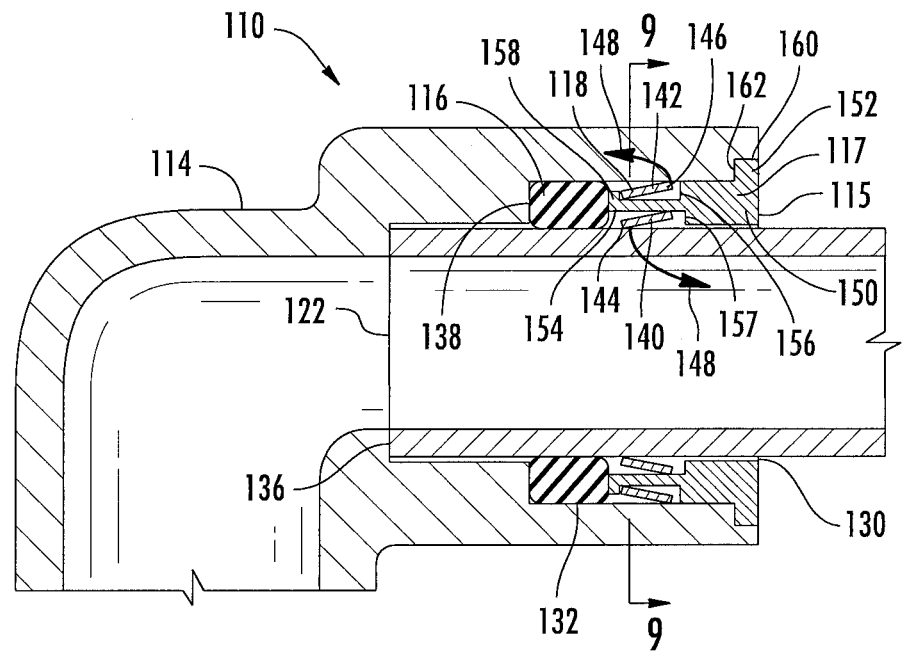
FIG. 8 is an axial cross-sectional view of the mechanical pipe coupling assembly of FIG. 7 in assembled form, taken along line 8-8 thereof.
Figure 9:
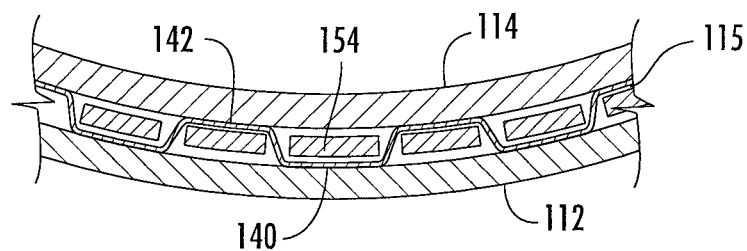
FIG. 9 is a partial vertical cross-sectional view of the mechanical pipe coupling assembly of FIGS. 7 and 8, taken along line 9-9 of FIG. 8.

The assembly and operation of the coupling 110 may thus be understood with reference to FIGS. 8 and 9. Initially, the seal ring 116 is inserted into the socket 130 within the bell portion 126 and fitted into place against the shoulder 138 within the profiled outer annular region 132. The locking device 115 is then fitted into the socket 130 within the bell portion 126 in the above-described manner, with the outer lip 152 of the support disk 117 seated in the recess 160 against the shoulder 162 of the bell portion 126. As the locking device 115 is thusly advanced into place, the exposed edges 146 of the outer corrugations 142 of the locking ring 118 make sliding contact with and are slightly flexed radially inwardly by the annular interior surface of the outer annular region 132 of the socket 130. The locking ring 118 may tend to be moved slightly axially relative to the support disk 117 which may tend to cause engagement of the outer corrugations 142 against the adjacent outer shoulder 156, in turn promoting a rotational moment within the locking ring 118 in the direction of arrow 148. However, the inner corrugations 140 remain out of contact with the adjacent inner shoulder 157, owing to a slightly greater axially recessed spacing of the inner shoulder 157 relative to the outer shoulder 156, as seen in FIG. 8. The respective lips 158 of the support element 154 come to rest in compressive abutment against the seal ring 116.

With the seal ring 116 and the locking device 115 in place within the fitting 114, the pipe end 122 is inserted into the socket 130 and advanced through the locking device 115 and the seal ring 116 until the end face of the pipe end 122 abuts against the innermost shoulder 136. The seal ring 116 is thereby compressed and conformed into sealing engagement with the outer annular surface of the pipe end 122 and the annular surface 132 within the socket 130. At the same time, the locking ring 118 is further deflected and tensioned by engagement of the pipe end 122 with the exposed edges 144 of the inner corrugations 140.

As in the embodiment of FIGS. 1-6, the locking device 115 in conjunction with the seal ring 116 radially supports and seals the pipe end 122 while effectively opposing forces imposed axially outwardly from the socket 130 of the fitting 114. Specifically, the locking ring 118 operates in substantially the same manner as above-described with regard to the locking ring 18 in the embodiment of FIGS. 1-6. Upon the exertion of an axially outward force on the pipe end 122, the engagement of the exposed edges 146 of the outer corrugations 142 of the locking ring 118 against the shoulder 156 induce a rotational moment within the locking ring 118 in the direction of arrows 148, in turn causing the central portions of the corrugations 140, 142 to bow slightly and to concentrate engagement of the corners of the corrugations 140, 142 against the outer annular surface of the pipe end 122 and the inner annular surface of the region 132 within the socket 130, thereby resisting and substantially preventing withdrawal of the pipe 112. In the embodiment of FIG. 7-11, the support disk 117 serves to precisely position and maintain an optimal orientation of the locking ring 118 with respect to the fitting 114 and the pipe end 122 and also to prevent any deleterious and potentially damaging contact of the locking ring 118 with the seal ring 116.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications, and equivalent arrangements, the present invention being limited only by the claims appended hereto and equivalents thereof.

What is claimed is:

1. A coupling assembly comprising a pipe, a fitting, and a connecting device mechanically joining the pipe and the fitting without an adhesive or bonding agent, wherein:
   the fitting comprises an end portion having an end opening defined by an interior annular surface,
   the pipe comprises an end having an outer annular surface received within the end opening of the fitting,
   the connecting device consists essentially of a seal ring, a locking ring and a spacer disk,
   the seal ring disposed within the end portion of the fitting in sealing contact with the interior annular surface thereof and with the outer annular surface of the pipe end,
   the locking ring disposed within the end portion of the fitting adjacent the seal ring substantially without an associated element supporting or stabilizing the locking ring,
   the locking ring including a plurality of corrugations extending circumferentially thereabout, the corrugations presenting inner edge portions engaging the outer annular surface of the pipe end and outer edge portions engaging the interior annular surface of the end portion of the fitting for opposing withdrawal of the pipe end axially outwardly from the fitting, and
   the spacer disk disposed within the end portion of the fitting between the seal ring and the locking ring.

2. A coupling assembly according to claim 1, wherein the fitting and the pipe are formed of a thermoplastic material.

3. A coupling assembly according to claim 2, wherein the fitting and the pipe are formed of polyvinyl chloride.

4. A coupling assembly according to claim 1, wherein the locking ring is formed of a metallic material.

5. A coupling assembly according to claim 1, wherein the locking ring has a generally frusto-conical shape.

6. A coupling assembly according to claim 5, wherein the corrugations of the locking ring extend at a conical angle of between about five degrees (5°) and about twenty-five degrees (25°).

7. A coupling assembly according to claim 6, wherein the corrugations of the locking ring extend at a conical angle of about fifteen degrees (15°).

8. A coupling assembly according to claim 1, wherein the corrugations of the locking ring have a generally squared configuration.

9. A coupling assembly according to claim 1, wherein the inner and outer edge portions of the corrugations are shaped.

10. A coupling assembly according to claim 1, wherein the pipe and fitting are adapted for non-pressurized fluid flow therethrough.

11. A coupling assembly according to claim 10, wherein the pipe and fitting are adapted for drain, waste and vent applications.

12. A coupling assembly according to claim 1, wherein:
   the end portion of the fitting comprises a socket having an essentially cylindrical interior annular surface,
   the interior annular surface of the socket includes an axially inner region of a diameter essentially mated to the outer annular surface of the pipe end and an axially outer region of a diameter enlarged from the axially inner region, the seal ring, the spacer disk and the locking ring being disposed adjacent one another within the enlarged outer region of the interior annular surface of the socket.

\* \* \* \* \*